US007984483B2

(12) United States Patent
Leitz et al.

(10) Patent No.: US 7,984,483 B2
(45) Date of Patent: Jul. 19, 2011

(54) SYSTEM AND METHOD FOR WORKING IN A VIRTUALIZED COMPUTING ENVIRONMENT THROUGH SECURE ACCESS

(75) Inventors: Raymond Francis Leitz, Treasure Island, FL (US); Thomas John Elowson, Bradenton, FL (US); Russell Scott Naples, Boca Raton, FL (US); Helge Solberg, Boca Raton, FL (US)

(73) Assignee: Acxess, Inc.

( * ) Notice: Subject to any disclaimer, the term of this patent is extended or adjusted under 35 U.S.C. 154(b) by 1088 days.

(21) Appl. No.: 11/789,542

(22) Filed: Apr. 25, 2007

(65) Prior Publication Data
US 2008/0271020 A1 Oct. 30, 2008

(51) Int. Cl.
H04L 9/32 (2006.01)
G06F 15/16 (2006.01)

(52) U.S. Cl. .................. 726/2; 726/3; 726/4; 726/15

(58) Field of Classification Search ............. 726/1–6, 726/14–16, 22, 26–30; 713/150, 164–167
See application file for complete search history.

(56) References Cited

U.S. PATENT DOCUMENTS

| | | | |
|---|---|---|---|
| 4,524,415 A | 6/1985 | Mills, Jr. et al. | |
| 4,912,628 A | 3/1990 | Briggs | |
| 5,230,069 A | 7/1993 | Brelsford et al. | |
| 5,555,385 A | 9/1996 | Osisek | |
| 6,694,346 B1 | 2/2004 | Aman et al. | |
| 6,738,977 B1 | 5/2004 | Berry et al. | |
| 6,754,181 B1* | 6/2004 | Elliott et al. | 370/252 |
| 6,788,980 B1 | 9/2004 | Johnson | |
| 6,823,509 B2 | 11/2004 | Webb | |
| 6,851,112 B1 | 2/2005 | Chapman | |
| 6,854,115 B1 | 2/2005 | Traversat et al. | |
| 6,931,544 B1 | 8/2005 | Kienhofer et al. | |
| 6,941,410 B1 | 9/2005 | Traversat et al. | |
| 7,020,738 B2 | 3/2006 | Neiger et al. | |
| 7,035,963 B2 | 4/2006 | Neiger et al. | |
| 7,124,273 B2 | 10/2006 | Glew et al. | |
| 7,124,327 B2 | 10/2006 | Bennett et al. | |
| 7,134,123 B1 | 11/2006 | Berry et al. | |
| 7,139,821 B1 | 11/2006 | Shah et al. | |
| 7,143,287 B2 | 11/2006 | Bade et al. | |
| 7,246,174 B2* | 7/2007 | Sciandra et al. | 709/244 |
| 2001/0021969 A1 | 9/2001 | Burger et al. | |

(Continued)

FOREIGN PATENT DOCUMENTS

EP 1 701 268 A2 9/2006

(Continued)

OTHER PUBLICATIONS (Author Unknown) "Citrix Presentation Server", accessed on Feb. 22, 2007 from URL address http://en.wikipedia.org/wiki/Citrix_Presentation_Server/.

Primary Examiner — Hosuk Song

(57) ABSTRACT

A personalized virtual computing system includes a plurality of client personal computers (PCs), each comprising at least a web browser and a communications client, a plurality of virtual machine hosts each comprising a communications server for communicating with the client PCs via said communications client, a web server comprising a client-customized web site, a directory database including identification information of authorized users and a database including a reservation table.

15 Claims, 5 Drawing Sheets

U.S. PATENT DOCUMENTS

| | | |
|---|---|---|
| 2002/0194242 A1 | 12/2002 | Chandrasekaran et al. |
| 2003/0056109 A1 | 3/2003 | Elliott et al. |
| 2003/0115453 A1 | 6/2003 | Grawrock |
| 2003/0126453 A1 | 7/2003 | Glew et al. |
| 2003/0188162 A1 | 10/2003 | Candelore et al. |
| 2003/0196085 A1 | 10/2003 | Lampson et al. |
| 2003/0217250 A1 | 11/2003 | Bennett et al. |
| 2003/0226040 A1 | 12/2003 | Challener et al. |
| 2004/0064813 A1 | 4/2004 | Neiger et al. |
| 2004/0117532 A1 | 6/2004 | Bennett et al. |
| 2004/0117539 A1 | 6/2004 | Bennett et al. |
| 2006/0136911 A1* | 6/2006 | Robinson et al. ............ 718/1 |

FOREIGN PATENT DOCUMENTS

| | | |
|---|---|---|
| WO | WO 2004/059440 A2 | 7/2004 |
| WO | WO 2005/052841 A2 | 6/2005 |
| WO | WO 2005/083564 A1 | 9/2005 |

\* cited by examiner

SYSTEM AND METHOD FOR WORKING IN A VIRTUALIZED COMPUTING ENVIRONMENT THROUGH SECURE ACCESS

FIELD OF INVENTION

This invention relates generally to the scheduling of workspaces within a virtual machine environment. More particularly this invention relates to a method and apparatus for delivering virtual workspace environments hosted on a cluster of physical machines which includes the scheduling, provisioning and the subsequent management and reporting of the virtual resources.

BACKGROUND OF INVENTION

There is a large amount of activity in the general field of virtual machines and virtualized computing environments. The prior art is replete with a large number of patented inventions and technical literature on the subject in question.

In today's era of rapid advances in field of computer world currently there exist numerous platforms, and prominent amongst them are Microsoft Windows™, Apple Macintosh™, OS/2™, UNIX™, Linux and NetWare™. This necessitates that software must be compiled separately to run on each of the said separate platforms. The binary file for an application that runs on one platform cannot run on another platform, on account of its limitation of being platform-specific.

A virtual workspace environment can be defined as a generic computing environment with one or more applications that have predefined or open command environments but not limited to either. This method effectively puts to use the computing environment.

At present there exist several approaches for provisioning equipment for the needs of the user community, including employees, customers and business partners.

The most common approaches/examples include the following:
a. Specific allocations of hardware, i.e., a predefined, single purpose environment.
b. Software that enables a virtual machine environment to be created, typically allowing a limited number of configuration options.

Citrix Systems has a proprietary client-server product called the Citrix Presentation Server (CPS) that utilizes a proprietary protocol called the Independent Computing Architecture (ICA) to pass keyboard, screen and mouse movements over a communications connection. The client side of CPS has a heterogeneous set of client types organized by language and device that all connect to a central set of one or more servers. The CPS servers constitute proprietary software that is installed on top of Microsoft Server 2003 with Terminal Services enabled. The Microsoft Terminal Services permits multi-user connectivity. The CPS software installs over the Microsoft Server 2003 and manages only the Citrix connected clients on the network. CPS is thus an add-on that extends the Microsoft platform.

Prior to 1997, there existed an earlier version of CPS, named WinFrame, that had generally similar functionality. Citrix Systems then had a license to use, manipulate and resell Microsoft Windows NT 3.51. Citrix then made Windows NT 3.51 into a multi-user product, built Citrix-specific clients for LAN and Dial-In connections and built the Intelligent Console Architecture protocol, the predecessor of the current ICA, which compressed and carried the keyboard, screen and mouse data over a communications connection.

Following an agreement with Microsoft in 1997, Citrix separated the multi-user core pieces and built them into the Microsoft base product which Microsoft has subsequently owned and maintained. The first version of Microsoft's integrated product was named NT 4.0 with Terminal Services and the corresponding client, the Remote Desktop Protocol (RDP). This has carried on this way for Microsoft from Windows 2000, Windows Server 2003 to Windows Vista.

The first subsequent Citrix product to the 1997 agreement with Microsoft was named MetaFrame and comprised the server side management functionality, the ICA protocol and the various client platforms. The Citrix product line has carried on as MetaFrame and now morphed into the Citrix Presentation Server (CPS).

U.S. Pat. No. 7,143,287 to Bade et al. describes a method and system for verifying binding of an initial trusted device to a secured processing system binds an initial device or replacement when no binding information is available from another device in the system.

U.S. Pat. No. 7,139,821 to Shah et al. discloses a method and apparatus for creating and deploying applications from a server application.

U.S. Pat. No. 7,134,123 to Berry et al. discloses an invention related to field of virtualized computing, in which the virtual machine is equipped with a reset operation function.

U.S. Pat. No. 7,124,327 to Bennett et al. discloses an invention related to virtual machine architecture. The patent further elaborates in one of the preferred embodiments, fault information relating to a fault associated with the operation of guest software.

U.S. Pat. No. 7,124,273 to Glew et al. discloses a method and apparatus for translating guest physical addresses in a virtual machine environment.

U.S. Pat. No. 7,035,963 to Neiger et al. discloses a mechanism for resolving address space conflicts between a virtual machine monitor and a guest operating system U.S. Pat. No. 7,020,738 to Neiger et al. discloses a method for resolving address space conflicts between a virtual machine monitor and a guest operating system.

U.S. Pat. No. 6,941,410 to Traversat et al. discloses a virtual heap for a virtual machine. The patent further elaborates an embodiment in which the virtual heap may be maintained on non-volatile memory storage external to the device running the virtual machine, and portions of the heap for the current execution state of the process may be cached in and out of a "physical" heap resident in local memory on the device.

U.S. Pat. No. 6,854,115 to Traversat et al. discloses a system and method for process persistence in a virtual machine.

U.S. Pat. No. 6,788,980 to Johnson discloses improved methods and apparatus for control using field and control devices that provide a virtual machine environment and that communicate via an IP network.

U.S. Pat. No. 5,555,385 to Osisek discloses a mechanism for allocation of address spaces within virtual machine compute system.

The art identified above have bulky designs and time consuming methods apart from lacking the ability to address client specific needs.

Another notable drawback in the existing art is that it does not cater to the need of deploying multiple virtual machine hosts that offers better economies of scale in deploying larger numbers of workspace environments.

Further, the prior art does not address the issues of providing secured access while working in a virtualized computing environment.

Accordingly there exists a need for providing a system and method for providing a secure access in a virtualized computing environment.

In view of the foregoing disadvantages inherent in the above-identified art, the general purpose of the present invention is:

to provide an improved combination of convenience and utility;

to include all the advantages of existing approaches;

to overcome the disadvantages/drawbacks of the prior art; and to provide a system and method for working in a virtualized computing environment while ensuring secure access.

SUMMARY OF INVENTION

The present invention provides an easy to use system and method for scheduling and provisioning end to end computing environments from hardware to operating system, virtualized or not virtualized, single or multi-user, through to application delivery.

It is an object of the present invention to create secure access over the Internet to one or more virtualized computing Workspace Environments.

It is a further object of the present invention to offer secure authentication of access to Workspace Environment.

It is another objective of the present invention to offer a customized and/or personalized Workspace Environment for computing.

It is a further object of the present invention to offer a reservation and scheduling (on-demand) of virtualized Workspace Environments.

It is another objective of the present invention to offer a self service sign-up with immediate access to virtualized Workspace Environment.

It is also an object of the present invention to offer a resource and allocation management of virtual workspaces.

It is a further object of the present invention to offer a capability to reinitialize a virtual workspace after each usage.

It is another objective of the present invention to offer a capability to manage the virtual resources.

It is yet another object of the present invention to offer the capability to report on the usage, status and availability of the virtual resources as they are mapped across the physical systems.

For a better understanding of the invention, its operating advantages and the specific objects attained by its user, reference is made to the accompanying drawings and descriptive matter in which there are illustrated embodiments of the invention.

BRIEF DESCRIPTION OF THE DRAWINGS

For a better understanding of the nature of the present invention, reference should be made to the detailed description taken in conjunction with the accompanying drawings in which.

DETAILED DESCRIPTION

The exemplary embodiments described in detail herein for illustrative purposes are subject to numerous variations. It is understood that various omissions, substitutions or equivalents are contemplated as circumstances may suggest or render expedient, but is intended to cover the application or implementation without departing from the spirit or scope of the invention.

The system and method of the present invention is directed at solving the problem faced by businesses such as those having a large number of workers who need to share personal computers or workstations for short periods of time, but each of whom may need access to differing software environments. The ideal solution of providing them with computers having a comprehensive range of software applications and adequate computational power might be cost prohibitive. The systems and method of the present invention enables businesses and organizations to provide web browser-based access to a virtualized computing environment that is personalized to the needs of individual users.

There are functional similarities between the present invention and the Citrix Presentation Server described earlier in this application. It should be noted that the present invention is broader in scope than the Citrix Presentation Server™ (CPS) in that it encapsulates and manages the various commercial off the shelf (COTS) products such as client server technologies (e.g., Microsoft 2003 Server™, CPS), virtualization technologies (e.g., VMWare™, Virtual PC™) as well as web based programs. In one aspect, the present invention can be viewed as a universal workspace broker that permits multiple disparate software products to be assembled into one or more virtual workspaces across a variety of communication interfaces including LANs, WANs, Dial-Up and the Internet.

The system and method of the present invention "util-i-tizes" the currently complex field of application deployment models by grouping them together under a unified, secure, structure that allows an IT administrator to deploy and manage the system very quickly and easily while providing the flexibility of compute method for end users.

Figure 1:
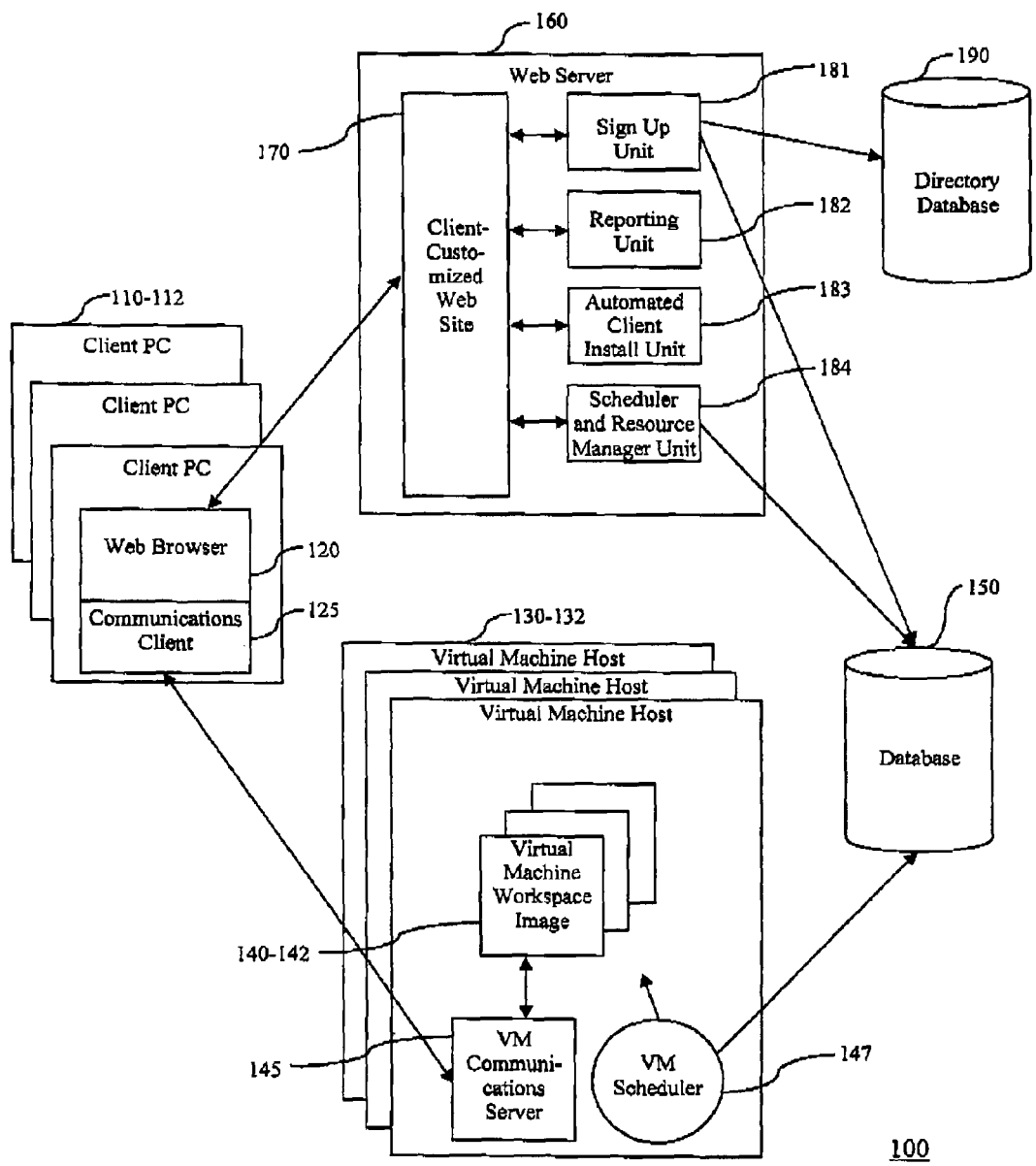
FIG. 1 is a schematic diagram of the components of a virtualized computing environment of the present invention

FIG. 1 is a schematic diagram of an exemplary embodiment of the virtual workplace solution 100 of the present invention. The system 100 comprises a plurality of Client Personal Computers 110-112 each of which include, at a minimum, a contemporary Web Browser 120 and a Communications Client 125 to facilitate secure and reliable communication between each of the client personal computers 110-112 and an exemplary remote Communications Server 145. It should be understood that each of the Client Personal Computers need not be desktop or laptop computers but could also be "thin clients", tablet computers, mobile computers, workstations or other devices with equivalent functionality.

The system 100 additionally comprises a Web Server 160 that includes a Client-Customized Web Site 170 that in turn links to a plurality of proprietary software modules for managing access to the personalized virtual computing environment of the present invention. These software modules include a Sign-up Unit 181, a Reporting Unit 182, a Client Install Unit 183 and a Scheduler and Resource Manager Unit 184.

The Sign-Up Unit 181 is a software module that manages the list of authorized users. It communicates with and periodically updates a comprehensive directory database 190 that identifies authorized users using their login ids and passwords or other, equivalent or superior, secure user authentication mechanism. The detailed functioning of the Sign-Up Unit 181 is set forth in the description of FIG. 2 that follows elsewhere in this patent application. The Reporting Unit 182 monitors and logs software and hardware usage and generates reports of user activity, and individual and group utilization parameters, both periodically and on demand. The Automated Client Installation Unit 183 is a software module that automates the generation of personalized virtual computing environments for authorized users.

The Scheduler and Resource Manager Unit 184 is a software module for managing software and hardware resources, reserving and deploying personalized computing environments for authorized users. The detailed functioning of the Scheduler and Resource Manager Unit 184 is set forth in the description of FIGS. 3 and 4 that follows elsewhere in this patent application. The Scheduler and Resource Manager Unit 184 checks for resource availability during the requested timeframe and tracks availability of system resources using a reservation table in the Database 150. The Resource Manager also tracks usage of system memory, CPU and storage and helps the software module estimate the time that (at which) any desired system resources would become available for the next user. In the preferred embodiment of the present invention, the time estimates also include the cleanup time for active Workspace Environments.

The Sign-Up Unit 181 and the Scheduler and Resource Manager Unit 184 also communicate with the Database 150 that contains information about the customized computing environments that are required by or authorized for certain users or groups of users. The Database 150 could be implemented as either a relational database, as a unitary table, or combinations thereof. In one embodiment of the present invention, this Database 150 is implemented as a SQL Database. In alternative embodiments of the present invention, the Database 150 could be implemented as an Oracle or a DB2 database.

The system 100 also comprises a plurality of Virtual Machine Hosts 130-132 that are typically servers that make available personalized virtual machines for individual users. In one embodiment of the present invention, each such Virtual Machine Host 130-132 comprises a plurality of Virtual Machine Workspace Images 140-142 that are each pre-configured for each user or group of users. Each of these Virtual Machine Workspace Images comprises one or more software applications tailored to the needs of a specific user or group of users. Each of the Virtual Machine Hosts 130-132 also includes a Communication Server 145 and a Virtual Machine Scheduler 147. The Communication Server 145 interfaces with the Communications Client 125 of the specific Client Personal Computer 110-112 used by a specific user. The VM Scheduler 147 is described in greater detail in conjunction with the description of FIG. 4 of this patent application.

Figure 2:
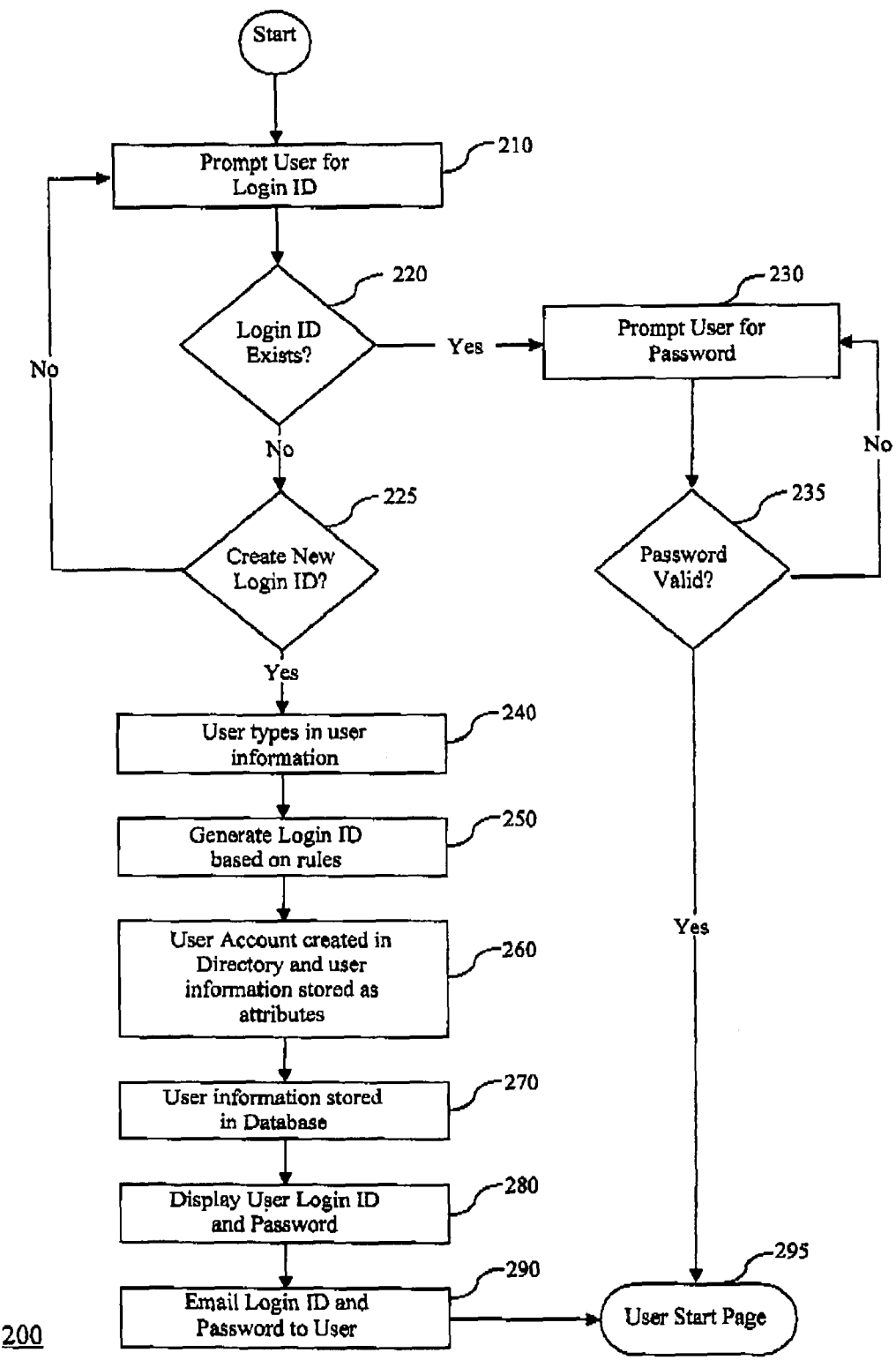
FIG. 2 is a sequential flow chart of the sign up process in accordance with the virtualized environment system of the invention.

FIG. 2 is a flow chart illustrating the sign-up process 200 for new users. As noted earlier, this process 200 details the functioning of the Sign-Up software module 181. The process starts at 210 with each user being prompted to enter their login ID. If the user enters a login ID at 210, this login ID is next checked for validity at 220.

If the user enters a valid login ID at 220, the user is next prompted for a password at 230. The user-entered password is next checked for validity at 235. If the password is found to be invalid at 235, the user is prompted again for a password at 230. In one embodiment of the present invention, a user who enters an incorrect or no password is provided a password hint or is permitted to authenticate themselves by an alternative method for a limited number of retries. A user who enters a valid password at 230 is then directed to a user-specific landing page at 295 wherein the user can access and utilize the virtualized software environment of the present invention.

If the user does not enter a valid login ID at 220, the user is queried at 225 as to whether they want to create a new Login ID. A user who indicates that they mis-entered their login ID is returned to 210. On the other hand, if the user indicates at 225 that they do not have a login ID, the user is first asked to enter pertinent biographical and personal information at 240. The user may also be optionally asked at 240 to request one or more specific login ID. A login ID is next generated at 250 based upon rules programmed into the Sign-Up software module 181.

Next, a User Account is created at 260 in the Directory 190 and the user information is stored as attributes therein. The user information is also stored in the Database 150 at 270. It should be noted that the process steps 260 and 270 may be performed sequentially in either order or simultaneously as software processes that are spawned in parallel.

Next, the login ID and password information is displayed on the user's screen at 280 and sent to the user by e-mail at 290. It should be noted that the process steps 280 and 290 may be performed sequentially in either order or simultaneously as software processes that are spawned in parallel. Following this, the user is finally directed to a user-specific landing page at 295 from where the user can access and utilize the virtualized software environment of the present invention.

Figure 3:
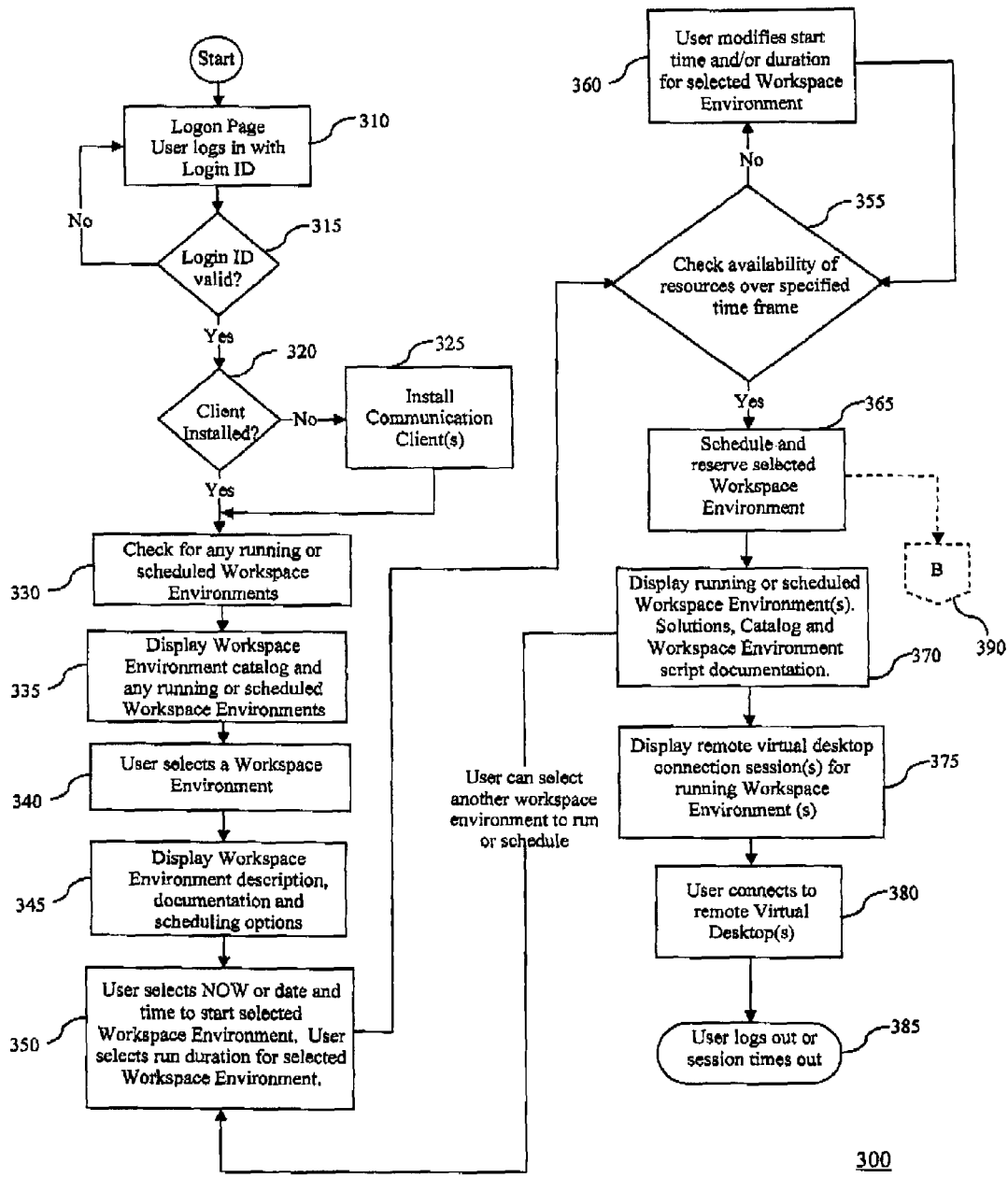
FIG. 3 is a sequential flow chart of the scheduling process in accordance with the virtualized environment system of an invention.

FIG. 3 is a flow chart depicting the scheduling process 300 that underlies the functionality of the Scheduler and Resource Manager Unit 184. This process begins at 310 with a user being presented with a logon page where they enter their login ID and password. The User ID is checked for validity at 315, optionally in conjunction with a user-provided password. If the password is found to be invalid at 315, the user is prompted again for a password at 310. In one embodiment of the present invention, a user who enters an incorrect or no password is provided a password hint or is permitted to authenticate themselves by an alternative method for a limited number of retries.

If the user is authenticated such as by a password, the software module 184 next checks to see if a suitable Communications Client is installed at 320. One example of a suitable communications client is the Independent Computing Architecture (ICA) client. As is known to practitioners in the field, ICA is Citrix Systems' thin client protocol. The Microsoft Remote Desktop Protocol, which is part of Microsoft's Terminal Services, is based on Citrix technology and was licensed from Citrix in 1997. Unlike traditional frame buffered protocols like VNC, ICA transmits high-level window display information, much like the X11 protocol, as opposed to purely graphical information.

If the Client Personal Computer 110-112 is found at 320 to not have a suitable Communications Client installed, then the software module 184 initiates the installation of the Communications Client at 325. Following this, or if the Client Personal Computer 110-112 is found at 320 to have a suitable Communications Client installed, the software module 184 next checks for any running or scheduled Workspace Environments associated with the user at 330. If any running or scheduled Workspace Environments are found at 330, they are displayed at 335 along with a catalog of available Workspace Environments. Next at 340, the user either selects a Workspace Environment from the list of available Workspace Environments or selects an already-running or scheduled Workspace Environments associated with the user.

The software module 184 next displays the description of the selected Workspace Environment along with documentation and scheduling options at 345. Next at 350, the user specifies whether they want to start the selected Workspace Environment immediately or at a later time. The user also optionally specifies the length of time for which the user expects to use the selected Workspace Environment.

The software system of the present invention uses this user input to determine if the requested resources are available for the specified time frame at 355. If the resources are unavailable in whole or in part during the specified time frame, the user is given an iterative opportunity to select a different time frame or a shorter duration for the selected Workspace Environment at 360. When the user selects a time frame and duration for a Workspace Environment that matches with resource availability, the Scheduling and Resource Management software module 184 schedules and reserves the selected Workspace Environment at 365 and in turn invokes associated processes at 390 for starting, stopping and recreating the Virtual Machine Workspace Environment of the present invention as set forth in greater detail below in conjunction with the description of FIG. 4 of this patent application.

Next, at 370, the software module 184 gives a user an additional opportunity to reserve or run a new Workspace Environment (or re-invoke a running Workspace Environment of that user that is then on "hold") by displaying all running or scheduled Workspace Environments associated with the user along with a catalog of Workplace Environments, software solutions and documentation. If the user decides to reserve or run another Workspace Environment, the process loops back to step 350. If the user decides to proceed with the then-selected Workspace Environment, the software module 184 next displays one or more remote virtual desktop connection session(s) for running the selected workspace environment(s) at 375. Next, the user connects to one or more remote Virtual Desktops at 380. The user session then continues at 385 till the user logs out or the user session times out. When a session times out or when a user logs out, the software module 184 updates the Database 150 that keeps track of the hardware and software resources of the present invention.

Figure 4:
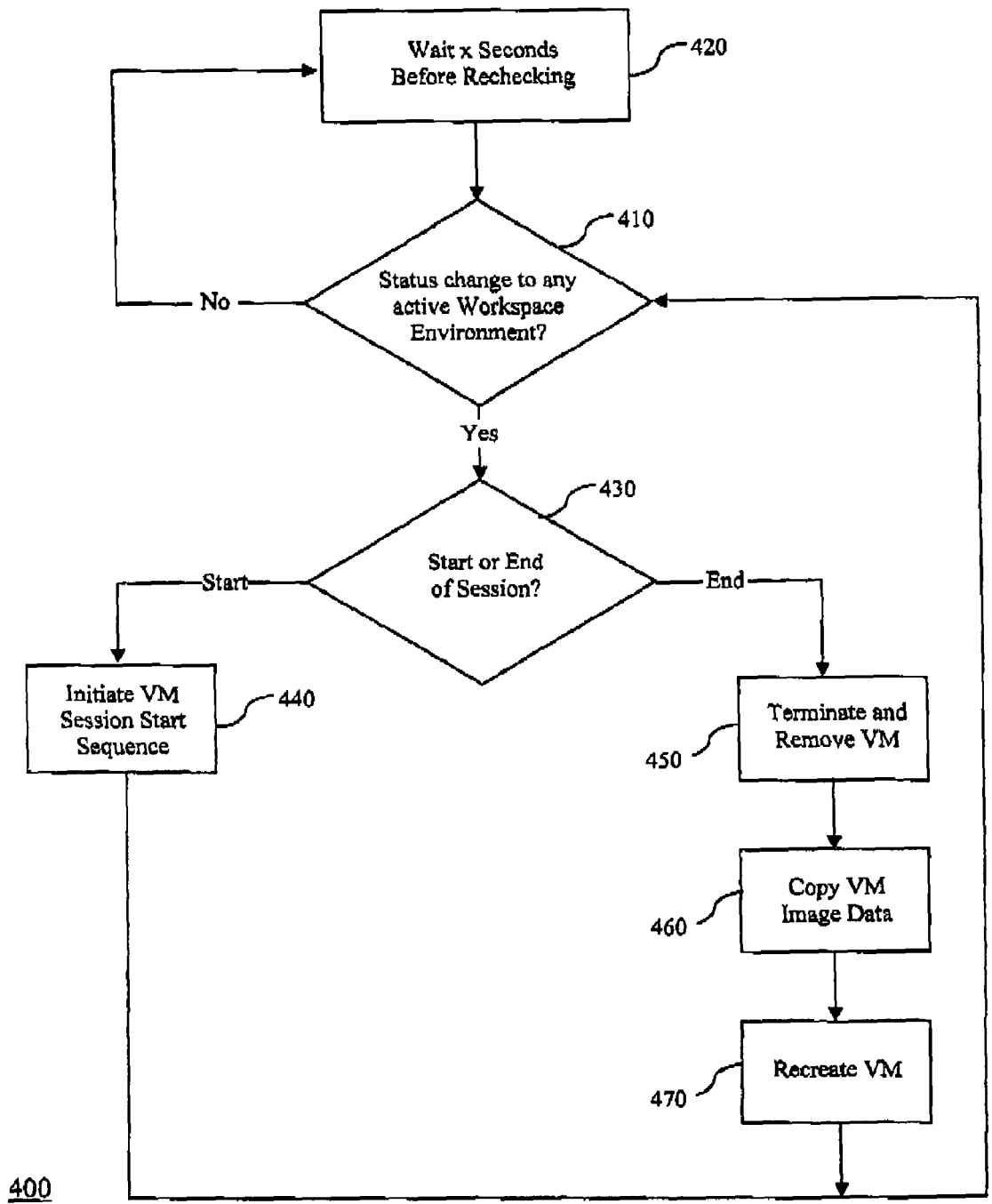
FIG. 4 is a sequential flow chart of the Virtual Server Scheduler process in accordance with the virtualized environment system of an invention.

FIG. 4 is a flow chart illustrating the process 400 embodied within software unit 184 for creating and terminating Workspace Environments and reserving, allocating and regenerating system resources to the Virtual Machines made available to individual users. The process starts at 410 with the software checking to see if any Workspace Environments that were last known to be active have since changed status. In one embodiment of the present invention, such status changes may be communicated by software or hardware interrupts generated by clocks or timers. In another embodiment of the present invention, these status changes may be stored in the Database 150 every time a user logs off or a user's session times out. Status changes can also be predicted from a resource reservation table that keeps track of users' sessions and Workspace Environment reservation requests.

If no status changes are found, the process loops back to a variable delay timer at 420 before returning to status checking at 420. If, on the other hand, a status change is detected or predicted at 410, the software module 184 next determines whether a session is to be started or ended at 430. If the query elicits that a new Virtual Machine workspace is to be created, the software initiates a VM Session Start Sequence at 440 before looping back to process step 410. If, on the other hand, the query 430 determines that a VM session is to be terminated, the software proceeds to terminate and remove the specific Virtual Machine workspace from the active session list at 450. This is followed by retrieval and storage of the VM Session data at 460 for later use by the same user, or for enterprise data synchronization. This, in turn is optionally followed by recreation of a standardized Virtual Machine that resets the Workspace Environment for use by the next user at 470, before looping back to process step 410.

Figure 5:
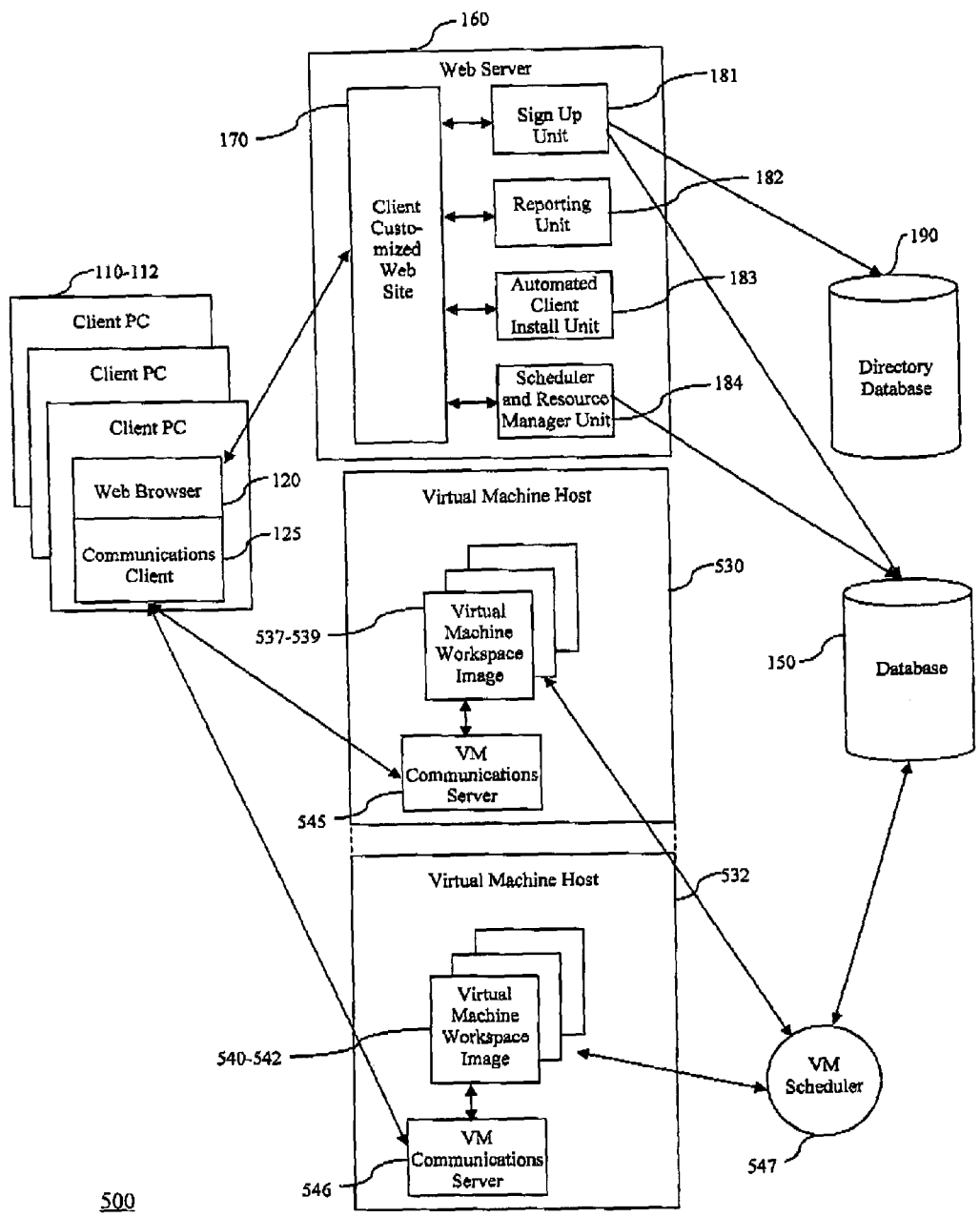
FIG. 5 is a schematic diagram depicting the working of the invention in a preferred embodiment in which there are numerous virtual machine hosts.

FIG. 5 is a schematic diagram showing an alternative embodiment of the present invention wherein a single Virtual Machine Scheduler 547 manages multiple Virtual Machine Hosts 530-532. Similar to the preferred embodiment of the present invention that is depicted in FIG. 1, the system 500 shown in FIG. 5 comprises a plurality of Client Personal Computers 110-112 each of which include, at a minimum, a contemporary Web Browser 120 and a Communications Client 125 to facilitate secure and reliable communication between each of the client personal computers 110-112 and exemplary remote Communications Servers 545 and 546. As noted earlier in conjunction with the description of FIG. 1, it should be understood that each of the Client Personal Computers are not limited to desktop and/or laptop computers but could also be "thin clients", tablet computers, mobile computers, workstations or other devices with equivalent functionality.

The system 500 additionally comprises a Web Server 160 that includes a Client-Customized Web Site 170 that in turn links to a plurality of proprietary software modules for managing access to the personalized virtual computing environment of the present invention. These software modules include a Sign-up Unit 181, a Reporting Unit 182, a Client Install Unit 183 and a Scheduler and Resource Manager Unit 184 that are substantially identical to the similarly named software modules described earlier in this patent application in conjunction with the description of FIG. 1-4 of this patent application.

The system 500 also comprises a plurality of Virtual Machine Hosts 530-532 that are typically servers that make available personalized virtual machines for individual users. In one embodiment of the present invention, Virtual Machine Host 530 comprises a VM Communications Server 545 and a plurality of Virtual Machine Workspace Images 537-539 that are each pre-configured for each user or group of users. Likewise, Virtual Machine Host 532 comprises a VM Communications Server 546 and a plurality of Virtual Machine Workspace Images 540-542 that are each pre-configured for each user or group of users. Each of these Virtual Machine Workspace Images comprises one or more software applications tailored to the needs of a specific user or group of users.

The system 500 also includes a centralized Virtual Machine Scheduler 547 that monitors the activity status of Virtual Machine Workspace Images and creates and stores Workspace Environments and regenerates them when an user's session ends or times out.

The Scheduler and Resource Manager Unit 184 checks for resource availability during the requested timeframe and tracks availability of system resources using a reservation table in the Database 150. The Resource Manager also tracks usage of system memory, CPU and storage and helps the software module estimate the time that any desired system resources would become available by the next user. The exemplary Communication Servers 545 and 546 interface with the Communications Client 125 of the Client Personal Computer 110-112 used by a specific user.

This embodiment of the present invention has superior economies of scale in increasing the number of active Virtual Machine Work Environments (like with the preferred embodiment) and also incorporates the ability to schedule and manage multiple Virtual Machine Hosts using a single centralized VM Scheduler 547 (unlike the preferred embodiment depicted in FIG. 1).

Although a preferred embodiment of the method and apparatus of the present invention has been illustrated in the accompanying drawings and described in the foregoing detailed description, it is to be understood that the invention is not limited to the embodiment(s) disclosed, but is capable of numerous rearrangements, modifications and substitutions without departing from the spirit of the invention as set forth and defined by the following claims.

We claim:

1. A personalized virtual computing system comprising:
   a plurality of client personal computers (PCs), each comprising at least a web browser and a communications client;
   a plurality of virtual machine hosts each comprising a communications server for communicating with the client PCs via said communications client;
   a web server comprising a client-customized web site, said web site being linked to a plurality of proprietary software modules and managing access to the virtual computing system;
   a directory database including identification information of authorized users; and
   a database including a reservation table wherein the software modules comprise: a sign-up unit, a reporting unit, a client install unit and a scheduler and resource manager unit.

2. The system of claim 1, wherein the sign-up unit manages a list of authorized users.

3. The system of claim 1, wherein the sign-up unit updates the directory database.

4. The system of claim 1, wherein the reporting unit monitors software and hardware usage.

5. The system of claim 1, wherein the client install unit automates generation of personalized virtual computing environments for authorized users.

6. The system of claim 1, wherein the scheduler and resource manager unit manages software and hardware resources.

7. The system of claim 1, wherein the scheduler and resource manager unit checks for resource availability during a requested timeframe and tracks availability of system resources using the reservation table.

8. The system of claim 1, wherein the scheduler and resource manager unit tracks usage of system memory, CPU and storage and estimates a time at which resources are available.

9. The system of claim 1, wherein the plurality of virtual machine hosts make personalized virtual machines available for individual users.

10. The system of claim 9, wherein each of the virtual machine hosts comprises:
    a plurality of virtual machine workspace images pre-configured for each user, each of said images including at least one software application tailored to a specific user; and
    a virtual machine scheduler.

11. The method of claim 9, wherein the communication client is the independent computing architecture (ICA) protocol.

12. The system of claim 1, wherein the client PC includes at least one of a desktop computer, a laptop computer, a tablet computer, a mobile computer, a personal digital assistant and a workstation.

13. A method for providing a personalized virtual computing environment, comprising:
    validating a user identity;
    verifying existence of a suitable communication client;
    displaying a catalog of available workspace environments, wherein said displaying comprises: checking for running or scheduled workspace environments associated with the user and displaying said workspace environments associated with the user;
    selecting by the user of one of the displayed workspace environments;
    presenting a description of the selected workspace environment;
    specifying by a user a time for invoking the process associated with the selected workspace environment and a length of time for using the invoked process; and
    invoking a process associated with the selected workspace environment.

14. The method of claim 13, wherein the workspace environments associated with the user are customized workspace environments.

15. The method of claim 14 further comprising:
    saving the customized workspace environments; and
    retrieving the saved customized workspace environments.

* * * * *